United States Patent [19]

Kelbel

[11] 4,063,470
[45] Dec. 20, 1977

[54] COMPACT PLANETARY GEAR ASSEMBLY

[75] Inventor: Donald William Kelbel, Muncie, Ind.

[73] Assignee: Borg-Warner Corporation, Chicago, Ill.

[21] Appl. No.: 722,238

[22] Filed: Sept. 10, 1976

[51] Int. Cl.² .................... F16H 57/10; F16D 67/02
[52] U.S. Cl. ................................ 74/785; 74/750 R; 192/18 R
[58] Field of Search ............... 74/785, 788, 750 R, 74/750 B, 665 R, 665 GA, 665 T; 192/18 R

[56] References Cited

U.S. PATENT DOCUMENTS

| | | | |
|---|---|---|---|
| 991,754 | 5/1911 | Schoonmaker | 74/785 |
| 2,068,437 | 1/1937 | Starr | 74/785 |
| 2,259,731 | 10/1941 | Burtnett | 74/785 X |
| 2,331,684 | 10/1943 | Henningsen | 74/785 |
| 2,708,017 | 5/1955 | Orr et al. | 192/18 R |
| 2,730,914 | 1/1956 | Rockwell | 192/18 R X |

FOREIGN PATENT DOCUMENTS 981,056  1/1976  Canada .................. 74/665 R

Primary Examiner—Benjamin W. Wyche
Assistant Examiner—Lance W. Chandler
Attorney, Agent, or Firm—Julian Schachner

[57] ABSTRACT

A power transfer mechanism incorporates a planetary or epicyclic gear set which may be shifted between high and low-range conditions to establish direct drive and reduction ratio drive modes. The ring and planet gears are unloaded in high, thus avoiding vibration and wear commonly experienced when running locked up. The carrier defines an output member within which the planetary assembly is nested, thereby providing a shortened installation length for this type of unit. A shifting sleeve under the ring gear bearing support further shortens installation length. The sleeve includes a floating shift collar which does not disengage from the ring gear, thus eliminating one set of mesh points commonly encountered in this type of range selection.

12 Claims, 4 Drawing Figures

U.S. Patent
Dec. 20, 1977
4,063,470
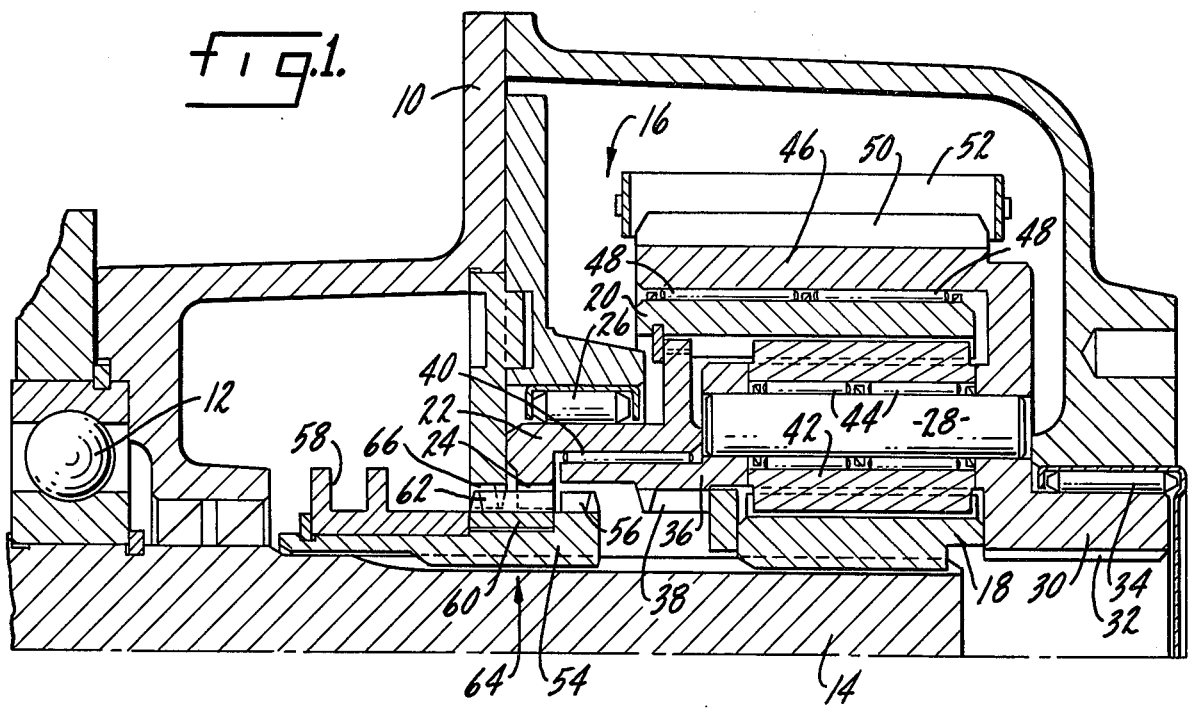
fig.1.
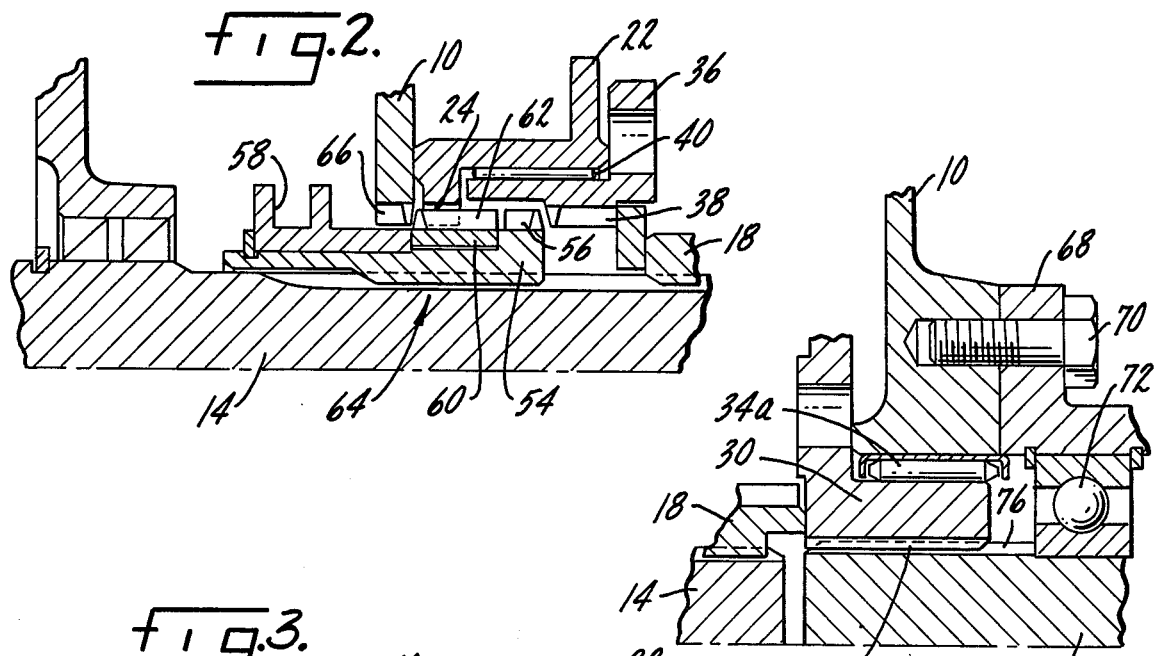
fig.2.
fig.4.
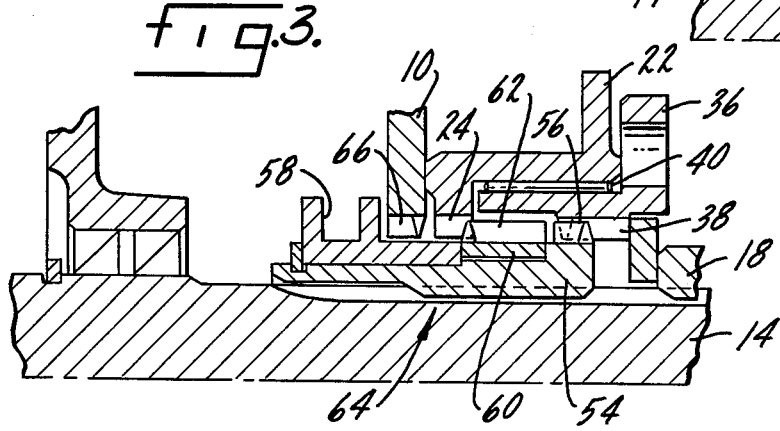
fig.3.

COMPACT PLANETARY GEAR ASSEMBLY

BACKGROUND OF THE INVENTION

This invention relates generally to a power transfer mechanism incorporating a planetary gear set. More particularly it relates to a compact planetary gear assembly having a minimum number of mesh points for establishing high and low-range modes.

In recent years there have been many improvements in power transfer mechanisms, including improvements relating to planetary gearing for establishing paths for the transfer of power in high and low-range modes. Some such planetary gear sets are shifted by engaging and disengaging friction elements manually, hydraulically, electrically, or by some other suitable means. Other planetary gear sets are shifted by engaging and disengaging clutches. Normally this is done by sliding sleeves into and out of dental engagement with various elements for establishing high and low-range modes. Generally, this has required considerable space and a large number of parts within the assembly. Furthermore, in these arrangements the system generally is such that the planet and ring gears are loaded when running locked up, thus causing vibration and excessive wear.

There remains a need to provide a compact planetary gear assembly which does not require excessive space when incorporated in a power transfer mechanism, which does not load the planet and ring gears when operating in the locked-up condition, and which requires a minimum number of mesh points for effective operation.

SUMMARY OF THE INVENTION

This invention is directed in brief to an improved planetary gear set capable of overcoming the deficiencies noted above. The planetary gear set includes an output member within which the gears are nested. Input is to the sun gear. Output is from the carrier. The planet and ring gears are unloaded in the high-range mode of operation. A shifting sleeve engages the input with the carrier for running in the high-range mode. The sleeve includes a floating collar constantly in mesh with the ring gear and capable of locking the ring gear to the housing for running in the low-range mode. Provision is made for torque splitting by providing an additional output from the carrier.

In direct drive the shifting sleeve engages the input with the carrier, transmitting power without loading the planet and ring gears, thus avoiding vibratory wear commonly experienced when running locked up. In reduction drive the floating collar locks the ring gear to the housing while the sleeve is disengaged from the carrier. In neutral the sleeve remains disengaged from the carrier and the floating collar is disengaged from the housing but not from the ring gear.

One application contemplated for the improved planetary gear set is in a four-wheel drive transfer case for use between a prime mover and a pair of drive axles. Such a transfer case would be adaptable for transferring torque from the prime mover to one axle directly and to the other axle through an overrunning clutch.

BRIEF DESCRIPTION OF THE DRAWING

The objects and advantages of this invention will become apparent to those skilled in the art upon careful consideration of the specification herein, including the drawing, wherein:

FIG. 1 is a sectional view showing details of the improved planetary gear assembly in the low-range mode establishing reduction ratio drive;

FIG. 2 is a partial sectional view showing details of the planetary gear assembly in neutral;

FIG. 3 is a partial sectional view showing details of the planetary gear assembly in the high-range mode establishing direct drive; and FIG. 4 is a partial sectional view showing details of the second output member.

While this invention is susceptible of embodiment in many different forms, there is shown in the drawing and will be described herein in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawing in greater detail, there is shown generally a housing 10 supporting a suitable bearing 12. It should be understood that housing 10 may be the housing of a transfer case for use in an associated automotive vehicle. An input shaft 14 is journaled in bearing 12 and extends into housing 10. It should be understood that shaft 14 may be the output shaft of a manual or automatic transmission incorporated in an associated automotive vehicle.

A planetary gear assembly 16 is mounted within housing 10. The assembly includes a sun gear 18 splined to input shaft 14 for rotation therewith. A ring gear 20 includes an extension 22 extending therefrom and defining teeth 24. Ring gear 20 is journaled in bearing 26 received within housing 10. A carrier 28 includes an end section 30 defining a spline 32. End section 30 is journaled in a bearing 34 received in housing 10. Carrier 28 also includes an end section 36 defining teeth 38. End section 36 is journaled in a bearing 40 received in extension 22 of ring gear 20. A plurality of planet gears 42 are journaled on bearings 44, which in turn are supported by carrier 28. Planet gears 42 are in mesh with sun gear 18 and ring gear 20.

End section 30 of carrier 28 also defines an output member 46 radially outwardly of gear set 16 and journaled on bearings 48, which in turn are supported by ring gear 20. Output member 46 may define sprocket teeth 50 which are coupled by means of a suitable chain 52 with a drive train to one or more axles of an associated automotive vehicle.

A shifting sleeve 54 is splined to input shaft 14 for rotation therewith, and is slidable along input shaft 14. Sleeve 54 defines teeth 56 and an annular groove 58 for engagement by a suitable shift fork, not shown. A floating collar 60 is loosely carried by sleeve 54 for rotation relative thereto. Collar 60 defines teeth 62. Sleeve 54 and collar 60 together form a clutch 64.

As shown in FIG. 1, clutch 64 is in the low-range position establishing reduction ratio drive. Teeth 62 of collar 60 are in mesh with teeth 24 of ring gear 20, and also with teeth 66 formed by housing 10. Effectively this locks ring gear 20 to housing 10. Torque is transferred from input shaft 14 to sun gear 18. Ring gear 20 acts as a reaction member, gears 42 planetate, and reduction ratio torque is directed through the gears to carrier 28 and its ouput member 46.

FIG. 2 shows the assembly in the neutral position. Clutch 64 has been shifted to the right to disengage teeth 62 of collar 60 from teeth 66 of housing 10. However, teeth 62 remain in mesh with teeth 24 of ring gear 20. In this position the planetary assembly freewheels and no torque is transmitted from input shaft 14 to output member 46.

In FIG. 3 clutch 64 has been shifted rightwardly to the high-range position establishing direct drive. Teeth 56 of sleeve 54 engage teeth 38 of carrier 28. Teeth 62 of collar 60 remain in mesh with teeth 24 of ring gear 20. Torque is transferred from input shaft 14 through sleeve 54 directly to carrier 28 and its output member 46. The planet and ring gears are unloaded.

Thus a compact assembly is provided wherein the carrier defines an output member concentric and radially outwardly aligned with the gears, thereby shortening the overall length of the assembly considerably. The gears are nested within the output member to provide the shortest possible arrangement. The clutch is located under the ring gear support bearing to further shorten the assembly length.

It also is seen that the floating collar remains in mesh with the ring gear at all times, thereby eliminating one set of mesh points normally required for assemblies of this type. In addition, the input and output are connected directly in the high-range position so that the planet and ring gears are unloaded.

An optical torque splitting feature may be provided as shown in FIG. 4. Bearing 34 is replaced by a bearing 34a without an end cover. A housing section 68 is secured to housing 10 by means of bolts 70 or the like. Housing section 68 supports a bearing 72 in which is journaled an output shaft 74. Output shaft 74 defines a spline 76 engaged with spline 32 of carrier 28. Thus an additional output path from carrier 28 is provided, which output path is in axial alignment with input shaft 14.

Other arrangements, modifications, and applications of the invention will be apparent to those skilled in the art and are deemed to be within the scope of the invention, which is limited only by the claims herein.

I claim:

1. A planetary gear assembly comprising a rotatable member, a sun gear secured to said member, a carrier, a ring gear, a plurality of planet gears journaled on said carrier in mesh with said sun and ring gears, and means for establishing a plurality of operating supported by said sleeve, said means being movable to a first position wherein said ring gear is grounded through said collar, and to a second position wherein said member and carrier are engaged through said sleeve, said collar being engaged with said ring gear in both positions.

2. The invention of claim 1, said means being movable to a third position wherein said member and carrier are not engaged through said sleeve and said collar is engaged with said ring gear.

3. The invention of claim 2, said third position being between said first and second positions.

4. The invention of claim 1, said carrier defining another member journaled on said ring gear.

5. In combination, a housing, an input shaft supported for rotation in said housing, a sun gear rotatable in response to rotation of said input shaft, a ring gear, an output carrier, at least one planet gear rotatably supported by said carrier in meshing relationship with said sun and ring gears, and a clutch for establishing low and high-range operating modes, said clutch including a sleeve rotatable in response to rotation of and slidable relative to said input shaft, and a collar rotatably supported by said sleeve, said sleeve being slidable to a low-range position wherein said collar is in meshing relationship with said ring gear and housing, and to a high-range position wherein said collar is in meshing relationship with said ring gear and said sleeve is in meshing relationship with said carrier.

6. The invention of claim 5, said sleeve being slidable to a neutral position wherein said collar is in meshing relationship with said ring gear.

7. The invention of claim 5, said carrier defining an output member supported for rotation concentric with and outwardly of said ring gear.

8. In combination, a housing, an input shaft journaled in said housing, a sun gear secured to said input shaft, a ring gear, an output carrier, a plurality of planet gears journaled on said carrier in mesh with said sun and ring gears, a sleeve slidable on said input shaft, and a collar journaled on and slidable with said sleeve, said collar being in constant mesh with said ring gear, said sleeve being slidable to a first position wherein said collar is engaged with said housing thereby grounding said ring gear to establish reduction drive, and to a second position wherein said sleeve is engaged with said input shaft and carrier to establish direct drive.

9. The invention of claim 8, said sleeve being slidable to a neutral position intermediate said first and second positions wherein said collar is disengaged from said housing and said sleeve is disengaged from said carrier.

10. The invention of claim 8, said carrier defining an output member concentric with and outwardly of said ring gear.

11. The invention of claim 10, said output member journaled on said ring gear.

12. The invention of claim 10, an output shaft secured to said carrier, said input and output shafts being coaxial.

* * * * *

UNITED STATES PATENT OFFICE
CERTIFICATE OF CORRECTION

PATENT NO. : 4,063,470
DATED : December 20, 1977
INVENTOR(S) : DONALD WILLIAM KELBEL It is certified that error appears in the above-identified patent and that said Letters Patent are hereby corrected as shown below:

Column 3, line 29, cancel "optical" and insert -- optional --

Column 3, line 49, after "operating" insert -- ranges, said means including a sleeve and a collar movably --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks